(12) United States Patent
Scheuermann et al.

(10) Patent No.: US 11,543,424 B2
(45) Date of Patent: Jan. 3, 2023

(54) MANUAL-ELECTRONIC PIPETTING DEVICE

(71) Applicant: ALPINA SCIENTIFIC GMBH, Neckargemuend (DE)

(72) Inventors: Stefan Scheuermann, Munich (DE); Roger Steinbrenner, Hirschhorn (DE); Ulrich Ackermann, Hirschhorn (DE)

(73) Assignee: ALPINA SCIENTIFIC GMBH, Neckargemuend (DE)

( * ) Notice: Subject to any disclaimer, the term of this patent is extended or adjusted under 35 U.S.C. 154(b) by 0 days.

(21) Appl. No.: 16/649,891

(22) PCT Filed: Sep. 24, 2018

(86) PCT No.: PCT/EP2018/075792
§ 371 (c)(1),
(2) Date: Mar. 23, 2020

(87) PCT Pub. No.: WO2019/057966
PCT Pub. Date: Mar. 28, 2019

(65) Prior Publication Data
US 2020/0278370 A1    Sep. 3, 2020

(30) Foreign Application Priority Data

Sep. 25, 2017 (DE) .................................. 17192950.8

(51) Int. Cl.
*G01N 35/10* (2006.01)
(52) U.S. Cl.
CPC .............................. *G01N 35/1011* (2013.01)

(58) Field of Classification Search
None
See application file for complete search history.

(56) References Cited

U.S. PATENT DOCUMENTS 4,589,810 A    5/1986 Heindl et al.
5,116,180 A    5/1992 Fung et al.
(Continued)

FOREIGN PATENT DOCUMENTS

EP    2 698 202 A2    2/2014

OTHER PUBLICATIONS

WO 2011/140063 A1 (Integra Biosciences Corp Formerly Viaflo Corp [US]; Warhurst Julian [U] Nov. 10, 2011 (Year: 2011).*
(Continued)

*Primary Examiner* — Brian R Gordon
(74) *Attorney, Agent, or Firm* — Oblon, McClelland, Maier & Neustadt, L.L.P.

(57) ABSTRACT

A manual-electronic pipetting device for pipetting a medium. The pipetting device includes a controller, a manually displaceable actuating element, at least one piston for aspirating and discharging the medium, a motor for driving the at least one piston in response to an actuation and/or displacement of the actuating element, at least one sensor for determining a displacement of the actuating element, and a data storage. The controller determines a pipetting protocol based on at least one sensor signal of the at least one sensor during a displacement of the actuating element, the controller further storing the pipetting protocol in the data storage, the pipetting protocol including data records indicative of a position and a speed of the at least one piston during the displacement of the actuating element.

15 Claims, 2 Drawing Sheets

(56) References Cited

U.S. PATENT DOCUMENTS

| | | | | |
|---|---|---|---|---|
| 5,567,122 | A * | 10/1996 | Schulte | F04B 23/06 |
| | | | | 417/415 |
| 7,726,212 | B2 | 6/2010 | Magnussen et al. | |
| 8,685,342 | B2 | 4/2014 | Steinbrenner et al. | |
| 2004/0033554 | A1* | 2/2004 | Powers | G01N 35/1083 |
| | | | | 435/29 |
| 2006/0085162 | A1 | 4/2006 | Bjornson et al. | |
| 2011/0268627 | A1* | 11/2011 | Warhurst | B01L 3/0227 |
| | | | | 422/511 |
| 2014/0004020 | A1* | 1/2014 | Tubbs | B01L 9/54 |
| | | | | 422/564 |
| 2014/0047931 | A1* | 2/2014 | Mettier | G01N 35/1011 |
| | | | | 73/863.01 |
| 2017/0341072 | A1* | 11/2017 | Reichmuth | G01F 11/029 |
| 2017/0370956 | A1 | 12/2017 | Hurwitz et al. | |
| 2018/0185836 | A1* | 7/2018 | Romer | B01L 3/0227 |

OTHER PUBLICATIONS

WO 2016/087046 A1 (Eppendorf AG [DE]) Jun. 9, 2016 (Jun. 9, 2016) (Year: 2016).*

Morscher, E., et al., "VIAFLO 96/384—Operating instructions V12", Integra Biosciences AG, XP55448160A, 2017, pp. 1-60.

* cited by examiner

MANUAL-ELECTRONIC PIPETTING DEVICE

FIELD OF THE INVENTION

The invention generally relates to the field of pipetting devices for pipetting, aspirating and/or discharging a medium. Specifically, the invention relates to a manual-electronic pipetting device and to a method for operating such manual-electronic pipetting device.

TECHNICAL BACKGROUND OF THE INVENTION

A variety of pipetting devices has been developed over the last years. For instance, various manually operated pipetting devices and/or manual pipetting devices have been developed, which are solely based on manual actuation e.g. of a plunger button by a user, wherein the plunger button usually is mechanically coupled to e.g. a piston. In response to an actuation of the plunger button by a user, the piston can be moved and the medium can be aspirated and/or discharged.

Further, several fully electronic pipetting devices have been developed, in which e.g. any movement of a piston for aspirating and discharging a medium is electronically controlled. Such devices may comprise one or more predefined pipetting programs, which may be selected by the user.

Apart from that, also manual-electronic and/or hybrid manual-electronic devices have been developed, which may allow both manual actuation as well as electronic actuation according to one or more predefined pipetting programs. However, defining a new pipetting program according to specific pipetting needs of the user and/or according to a specific pipetting operation in either the electronic pipetting devices or the manual-electronic pipetting devices usually is a tricky and only hardly manageable for users.

SUMMARY OF THE INVENTION

It would be advantageous and/or desirable to have an improved manual electronic pipetting device, which can easily be programmed by a user of the pipetting device.

To better address one or more of these concerns, according to a first aspect of the invention a manual-electronic pipetting device for pipetting, aspirating and/or discharging a medium is provided. The medium may be any kind and/or type of fluid, such as e.g. a liquid, a gas, and/or any mixture thereof. The manual-electronic pipetting device may refer to a hybrid manual-electronic device, and/or the manual-electronic pipetting device may be referred to as "the pipetting device" hereinafter. The pipetting device comprises a controller, at least one manually displaceable actuating element, at least one piston for aspirating and discharging the medium, a motor and/or drive for driving the at least one piston in response to an actuation and/or displacement of the actuating element, at least one sensor for determining a displacement of the actuating element, and a data storage for storing data. The controller is configured to determine and/or generate a pipetting protocol based on at least one sensor signal of the at least one sensor during a displacement of the actuating element and/or during a movement of the at least one piston, e.g. in response to a displacement of the manually displaceable actuating element. Therein, the manually displaceable actuating element may be displaced by a user of the pipetting device. Further, the controller is configured to store, particularly automatically store, the pipetting protocol in the data storage, the pipetting protocol comprising data records indicative of and/or related to a position and a speed of the at least one piston during the displacement of the actuating element and/or during a movement of the at least one piston, e.g. in response to a displacement of the manually displaceable actuating element.

The controller may refer to an electronic controller, a control circuitry, a control circuit, a control module and/or a controller arrangement. The controller may comprise one or more processors. The controller may be coupled, particularly electronically coupled, to the at least one sensor and/or the controller may be configured to process one or more sensor signals of the at least one sensor. Further, the controller may be coupled to the motor and/or drive. The controller may be configured to actuate the motor according to and/or in response to one or more sensor signals of the at least one sensor. Further, the data storage and/or a further data storage device of the pipetting device may comprise software instructions and/or computer-executable instructions, which, when executed by the controller, instruct the pipetting device to execute any of the features, functions and/or steps, as described above and in the following.

Generally, the manually displaceable actuating element may be configured for manual actuation by a user of the pipetting device. In other words, the actuating element may be displaced and/or actuated, particularly manually displaced and/or actuated, by the user of the pipetting device. Further, the actuating element may refer to any type of manually actuatable and/or displaceable element, such as e.g. a button, a plunger button, a lever, a translationally displaceable lever, a rotationally displaceable lever, a handle or the like. The actuating element may be displaceable within a displacement range of the actuating element ranging from a starting and/or initial position of the actuating element to an end and/or final position of the actuating element. Further, the actuating element may be displaced by the user translationally and/or rotationally e.g. along at least one displacement direction of the actuating element. By way of example, the actuating element may be displaced translationally in at least two opposite directions. Alternatively or additionally, the actuating element may be rotated around a rotational axis in at least two opposite directions. The actuating element may be pre-stressed and/or biased towards the initial and/or starting position.

The at least one piston may be coupled to the motor and/or the piston may be actuated and/or driven by the motor. At least a part of the piston may be movably arranged in at least one fluid compartment. However, the at least one piston may be coupled to the at least one fluid compartment, e.g. via a cylinder plate and/or a pin plate. Particularly, the piston may be movable along a longitudinal extension direction of the piston and/or of the fluid compartment. Accordingly, the fluid compartment and/or at least one cylinder of the cylinder plate may receive at least a part of the piston. Therein, the at least part of the piston may be fluid-tightly arranged in the fluid compartment and/or the at least one cylinder of the cylinder plate. The fluid compartment and/or the cylinder of the cylinder plate may be shaped correspondingly to the piston. The fluid compartment may e.g. be a cylindrically and/or conically shaped pipetting tip, in which at least a part of the piston is, e.g. movably, arranged. The fluid compartment may comprise an opening on one end and/or on a distal end via which a fluid may be aspirated into the fluid compartment and/or discharged from the fluid compartment according to and/or in response to a movement and/or displacement of the at least one piston. It is to be noted that the pipetting device may comprise a plurality of pistons and/or a plurality of fluid compartments, wherein at least a part of each piston may be movably and/or fluid-tightly arranged in one of the plurality of fluid compartments.

The term "position" of the piston may refer to a position of the piston in the fluid compartment and/or a position of a front surface of the piston, which front surface may be arranged in the fluid compartment. The piston may be moved between an initial position and a final position of the piston in the fluid compartment. The initial position may refer to a minimum stroke of the piston and/or the final position may refer to a maximum stroke of the piston. Hence, the piston may be moved between the minimum stroke and the maximum stroke. Accordingly, the position of the piston may refer to a position between the initial position and the final position and/or between the minimum stroke and the maximum stroke. Further, the speed of the piston may refer to a velocity of the piston during movement of the piston and/or to a change of the position of the piston per unit time during movement of the piston.

When the actuating element is actuated and/or displaced by the user, the controller may actuate the motor and/or instruct the motor, e.g. by providing a control signal to the motor, to drive, move and/or actuate the at least one piston in response to and/or according to the manual displacement of the actuating element. Accordingly, any actuation of the piston may be mechanically decoupled from the actuation and/or displacement of the actuating element. Alternatively or additionally, any actuation and/or movement of the piston may be electronically controlled, e.g. solely electronically controlled, by the controller. Alternatively or additionally the actuating element may be mechanically coupled to the piston.

Generally, any movement and/or displacement of the manually displaceable actuating element may be translated, e.g. by the controller, to a movement of the at least one piston and/or the motor may be instructed, e.g. by the controller, to move the piston according to the displacement of the actuating element. Therein, the movement of the piston may correspond to and/or correlate with at least one of a distance by which the actuating element is displaced, a direction in which the actuating element is displaced and a speed at which the actuating element is displaced.

By way of example, the actuating element may be displaceable in a first direction and a second direction, e.g. opposite to the first direction. When the actuating element is displaced in the first direction, the at least one piston may move in a first direction. When the actuating element is displaced in a second direction, the at least one piston may be moved in a second direction, e.g. opposite to the first direction. Alternatively or additionally, when the actuating element is displaced at a first speed, e.g. in the first or second direction, the at least one piston may be moved (e.g. in the first or second direction of the piston) at a first speed corresponding to and/or correlating with the first speed, at which the actuating element is displaced. Further, when the actuating element is displaced at a second speed, e.g. in the first or second direction, that is different from the first speed, the at least one piston may be moved (e.g. in the first or second direction of the piston) at a second speed corresponding to and/or correlating with the second speed, at which the actuating element is displaced. Therein, the second speed of the piston may differ from the first speed. Alternatively or additionally, when the actuating element is displaced by a first distance, e.g. in the first or second direction, the at least one piston may be moved (e.g. in the first or second direction of the piston) by a first distance corresponding to and/or correlating with the first distance, by which the actuating element is displaced. Further, when the actuating element is displaced by a second distance, e.g. in the first or second direction, that is different from the first distance, the at least one piston may be moved (e.g. in the first or second direction of the piston) by a second distance corresponding to and/or correlating with the second distance, by which the actuating element is displaced. Therein, the second distance of the piston movement may differ from the first distance.

Generally, the pipetting protocol and/or the data records contained therein may describe a pipetting operation and/or a pipetting action performed by the user by manually actuating and/or displacing the actuating element, and/or by moving the piston in response to the displacement of the actuating element. Accordingly, the pipetting protocol and/or the data records contained therein may be indicative of and/or related to a pipetting operation and/or pipetting action, e.g. performed by the user by displacing the actuating element. The user may actuate the actuating element during a pipetting operation and/or action at one specific speed or at various different speeds. In response to and/or corresponding to the actuation of the actuating element, the at least one piston may be moved. Accordingly, the piston may move at a speed or at various different speeds corresponding to and/or correlating with the speed or the various speeds, with which the actuating element is moved, displaced and/or actuated. The speed of the actuation and/or displacement of the actuating element and/or the speed of the at least one piston may e.g. be adjusted by the user according to the medium and/or according to characteristics of the medium, such as e.g. a temperature of the medium, a viscosity of the medium and/or a chemical composition of the medium. Alternatively or additionally, a distance, by which the actuating element is displaced by the user, an angle, by which the actuating element is displaced, an angular velocity (and/or rotational speed), with which the actuating element is displaced, a direction, in which the actuating element is displaced by the user, a discharged volume of the medium, and/or an aspirated volume of the medium may be adjusted by the user according to the medium and/or the characteristics of the medium. Accordingly, the pipetting protocol and/or the data records contained therein may be indicative and/or related to the speed of the displacement, the distance of the displacement, the angle of the displacement, the angular velocity (and/or rotational speed) of the displacement, the direction of the displacement, the aspirated volume, the discharged volume, the aspirated volume per unit time, and/or the discharged volume per unit time. Hence, the pipetting protocol may refer to a pipetting program describing and/or correlating with the pipetting operation and/or the pipetting action performed by the user. In other words, by means of the pipetting protocol the pipetting operation and/or the pipetting action performed by the user may be described.

Rephrasing the first aspect of the invention, the controller may be configured to process one or more sensor signals of the at least one sensor during actuation and/or displacement of the actuating element and/or during movement of the at least one piston. Further, the controller may be configured to derive the pipetting protocol and/or the data records of the pipetting protocol during displacement of the actuating element and/or during movement of the at least one piston based on at least one sensor signal of the at least one sensor. During and/or in response to the actuation and/or displacement of the actuating element, the at least one piston may be moved. During displacement of the actuating element and/or during movement of the at least one piston, the controller may be configured to determine, generate and/or derive the pipetting protocol based on one or more sensor signals of the sensor and/or based on processing the one or more sensor signals of the sensor. The controller may then store the pipetting protocol and/or the data records in the data storage. The pipetting protocol may be stored online during displacement of the actuating element and/or it may be buffered, e.g. in a further data storage, and stored in the data storage after displacement of the actuating element. The pipetting protocol may be stored as an arbitrary data file in an arbitrary data format in the data storage. Therein, the pipetting protocol comprises data records and/or data indicative of and/or related to the position and the speed of the at least one piston during the displacement of the actuating element and/or during movement of the at least one piston. Accordingly, the data records may be representative, may represent and/or may correlate with a movement of the piston. Alternatively or additionally, the data records of the pipetting protocol and/or the pipetting protocol may be indicative of, related to, correlate with and/or represent a volume per unit time and/or a volume of fluid aspirated and/or discharged during at least a part of a time interval, in which the actuating element may be displaced and/or manually actuated. Further, the data records of the pipetting protocol and/or the pipetting protocol may be indicative of, related to, correlate with and/or represent a distance and a speed of the displacement and/or of the actuation of the actuating element during at least a part of the time interval, in which the actuating element is actuated. Therein, the distance of the displacement may refer to an angle and/or a displacement angle, by which the actuating element is displaced. Further, the speed of the displacement may refer to an angular velocity, an angular speed and/or a rotational speed, with which the actuating element is displaced. Alternatively or additionally, the data records of the pipetting protocol and/or the pipetting protocol may be indicative of, related to, correlate with and/or represent a position of the actuating element and/or a speed of a movement of the actuating element during at least a part of the time interval, in which the actuating element is actuated. Alternatively or additionally, the data records of the pipetting protocol and/or the pipetting protocol may be indicative of, related to, correlate with and/or represent one or more sensor signals of the sensor and/or one or more sensor signals of the sensor per unit time.

By means of the pipetting protocol the pipetting action and/or the pipetting operation performed manually by the user may be stored. This advantageously allows the user to manually actuate the actuating element according to specific needs of the pipetting operation and to record the performed pipetting operation in the pipetting protocol. Specifically, the user may perform the pipetting operation according to the medium and/or according to characteristics of the medium, such as e.g. a viscosity, a temperature, a phase and/or a chemical composition of the medium. Also, it may be favorable and/or desirable for the user to have a visual control of the performed pipetting operation and to adjust the pipetting operation, e.g. a speed and/or distance of the displacement of the actuating element, according to this visual control. Any of such adjustment during the pipetting operation may also be stored in and/or described by the pipetting protocol and/or the data records contained therein. Moreover, manually displacing the actuating element may allow a fine tuning of the pipetting operation performed by the user. Such fine tuning may not be provided e.g. by conventional full electronic pipetting devices. Apart from that, by storing the pipetting protocol, the pipetting protocol may be read after the pipetting operation to keep track of the performed pipetting operation. Moreover, the pipetting protocol may advantageously be distributed to other users.

Further, the pipetting protocol may be used to instruct the pipetting device to repeat the pipetting protocol, such that any movement of the at least one piston may be automatically reproduced and/or repeated by the pipetting device according to the pipetting protocol and/or the data records contained therein. In other words, the controller may be configured to instruct motor to actuate and/or move the at least one piston according to the pipetting protocol and/or the data records contained therein. Hence, no programming of the pipetting device by the user may be required, but rather the user may manually operate the pipetting device one time and can repeat the exact same pipetting operation an arbitrary number of times.

According to an embodiment of the invention, the controller is configured to read the pipetting protocol and to automatically control the position and the speed of the at least one piston according to the data records of the pipetting protocol. The controller may be configured to read at least a part of the data records of the pipetting protocol. Further, the controller may be configured to control the position and the speed of the at least one piston according to the data records of the pipetting protocol based on and/or by actuating the motor. Accordingly, the controller may read at least a part of the pipetting protocol, may derive one or more control signals from at least a part of the data records, and/or may provide the one or more control signals to the motor, such that the position and the speed of the piston is controlled according to the pipetting protocol and/or according to the data records contained therein. Accordingly, the controller may be configured to actuate and/or instruct the motor, e.g. based on the one or more control signals, to move the piston according to the data records of the pipetting protocol. Thereby, the piston position and speed may be controlled by the controller in a fully automated manner and/or without an actuation and/or displacement of the actuating element. This allows to read a pipetting protocol, to run and/or execute the pipetting protocol automatically, e.g. like a pipetting program, such that the pipetting device may advantageously repeat the pipetting protocol and/or repeat a pipetting operation described in the pipetting protocol. This significantly simplifies handling and/or operation of the pipetting device with respect to conventional devices, as the pipetting device may be manually operated by manually actuating and/or displacing the actuating element one time, thereby potentially taking into account specific needs of the respective pipetting operation, and the same pipetting operation may be repeated an arbitrary number of times by reading and/or automatically executing the pipetting protocol. Hence, also any programming and configuration of the pipetting device, e.g. via a user interface is not required, as the pipetting device can be operated manually for programming the pipetting device. Also, this provides a very intuitive way of generating a pipetting protocol and/or a pipetting program, wherein this intuitive way may be suitable for any staff and/or personnel using the pipetting device. Further, the pipetting protocol, which may have been created by one user, may be exactly repeated by another user. This may significantly increase efficiency of a workflow, e.g. in a laboratory.

According to an embodiment of the invention, the controller is configured to determine and/or derive at least one pipetting step during a displacement of the actuating element and/or a movement of the at least one piston based on at least one sensor signal of the at least one sensor. Alternatively or additionally, the controller is configured to store, in the pipetting protocol, data records indicative of and/or related to at least a distance, a direction, a speed, and/or an angle of the displacement of the actuating element during the at least one pipetting step. Therein, the distance of the displacement may refer to a displacement distance and/or a length of the displacement, by which the actuating element is displaced. Alternatively or additionally, the distance of the displacement may refer to an angle, by which the actuating element is displaced. Further, the speed of the displacement may refer to an angular velocity, an angular speed, and/or a rotational speed, by which the actuating element is displaced. Also, data records indicative of a direction, in which the actuating element is displaced may be stored. Alternatively or additionally, data records indicative of the position and speed of the piston, indicative of the readings and/or the sensor signals, and/or indicative of a discharged and/or aspirated volume during the at least one pipetting step may be stored in the pipetting protocol. As described above, the actuating element may be displaceable within a displacement range of the actuating element, the displacement range ranging from a starting and/or initial position of the actuating element to an end and/or final position of the actuating element. The displacement range of the actuating element may be referred to as full displacement of the actuating element. During a pipetting operation, the actuating element may be displaced by the user from the initial position to the final position of the actuating element, and/or it may be displaced by the full displacement. By way of example, a maximum volume may be aspirated during a full displacement of the actuating element in a first direction. Likewise, the maximum volume may be discharged during a full displacement of the actuating element in a second direction opposite to the first direction. According to the specific needs and/or constraints of pipetting operations performed by the user, the full displacements of the actuating element may differ at least in terms of a speed, with which the actuating element is displaced, and/or in terms of a direction, in which the actuating element is displaced Alternatively to the full displacement, the actuating element may be displaced by the user by one or more partial displacements between the initial and the final position of the actuating element. The partial displacements may differ in terms of a distance and/or an angle, by which the actuating element is displaced, in terms of a speed, with which the actuating element is displaced, and/or in terms of a direction, in which the actuating element is displaced. The full displacement and/or the partial displacement may be referred to as pipetting step. Accordingly, a pipetting step may refer to and/or comprise a single displacement of the actuating element. Therein, the single displacement may comprise at least one of a distance and/or an angle, by which the actuating element, a speed, with which the actuating element is displaced, and a direction, in which the actuating element is displaced. Storing data records indicative of the distance, the angle, and/or the speed of the actuating element may allow to exactly reproduce a pipetting operation, e.g. by reading and/or executing the respective pipetting protocol. Further, complex pipetting operations, which may comprise a plurality of pipetting steps, may represented and/or mapped with the pipetting protocol.

According to an embodiment, the controller is configured to instruct the motor, in response to a displacement of the manually displaceable actuating element in a first direction and at a speed varying during the displacement of the actuating element in the first direction, to move the at least one piston in a first direction at a speed varying during the movement of the at least one piston in the first direction, wherein the varying speed of the piston corresponds to and/or correlates with the varying speed of the actuating element. Further, the controller may be configured to determine the pipetting protocol based on at least one sensor signal of the at least one sensor during the displacement of the actuating element, and to store the pipetting protocol in the data storage. The pipetting protocol may comprise data records indicative of the speed of the piston, which varies during the displacement of the actuating element in the first direction and/or during movement of the piston in the first direction. Accordingly, a speed, at which the actuating element is displaced in one direction may be variable and/or varied, and the piston may be moved in one direction at a variable and/or varying speed corresponding to the variable and/or varying speed of the actuating element. During such displacement of the actuating element and/or during such movement of the piston, the controller may determine the pipetting protocol and store it. This allows to operate the pipetting device analogue to a manual pipetting device, while also generating and storing the corresponding pipetting protocol in an intuitive manner.

By way of example, the user may displace the actuating element in a first direction by a first distance and at a first speed. The user may then displace the actuating element in the first direction by a second distance and at a second speed, wherein the second speed differs from the first speed. In response to and/or in accordance with this displacement of the actuating element, the controller may instruct the motor to move the piston in the first direction by a first distance and at a first speed. The controller may further instruct the motor to move the piston in the first direction by a second distance and at a second speed, wherein the second speed of the piston differs from the first speed. The controller may further derive the pipetting protocol and store the pipetting protocol in the data storage. Therein, the pipetting protocol may comprise data records indicative of the first speed, the first direction and/or the first distance of the piston's movement. The pipetting protocol may further comprise data records indicative of the second speed, the first direction and/or the second distance of the piston's movement. This allows to operate the pipetting device analogue to a manual pipetting device, e.g. by displacing the actuating element in one direction at different speeds, while also generating and storing the corresponding pipetting protocol in an intuitive manner.

According to an embodiment of the invention, the pipetting device comprises a further actuating element, wherein the controller is configured to determine a termination of a single pipetting step based on an actuation of the further actuating element. Accordingly, by actuating the further actuating element, the user may signal termination of a single pipetting step to the controller. The further actuating element may be any kind of actuating element such as e.g. a button and/or a lever. Further, the pipetting protocol may comprise one or more data records indicative of the termination of the at least one pipetting step, such as e.g. at least one termination data record.

According to an embodiment of the invention, the controller is configured to determine a termination of a single pipetting step based on determining and/or comparing a time period between two consecutive displacements of the actuating element with a predefined threshold. The termination of the pipetting step may refer to an end of a pipetting step. The predefined threshold may be a time threshold and/or may be stored in the data storage. By way of example, the predefined threshold may range from 0.5 seconds to about 30 seconds, preferably from 1 second to about 10 seconds. This allows automatic detection and/or determination of the termination and/or the end of a pipetting step, particularly without requiring any further user action, such as e.g. an actuation of a further actuating element.

According to an embodiment of the invention, the pipetting protocol comprises a sequence of and/or a plurality of pipetting steps. In other words, the pipetting protocol may comprise data records indicative of and/or related to a sequence of pipetting steps. Alternatively or additionally, the pipetting protocol may comprise one or more termination data records, each termination data record being indicative of and/or representing a termination and/or an end of a single pipetting step of the sequence of pipetting steps. The sequence of pipetting steps may be a sequence of consecutive pipetting steps.

According to an embodiment of the invention, the pipetting protocol comprises a sequence of pipetting steps, e.g. a sequence of consecutive pipetting steps, wherein the controller is configured to read the sequence of pipetting steps from the pipetting protocol and to control the position and the speed of the at least one piston according to the sequence of pipetting steps. In other words, pipetting protocol may comprise data records indicative of and/or related to a sequence of pipetting steps, e.g. a sequence of consecutive pipetting steps, wherein the controller is configured to read data records of the pipetting protocol indicative of and/or related to the sequence of pipetting steps from the pipetting protocol and to control the position and the speed of the at least one piston according to the data records indicative of and/or related to sequence of pipetting steps. Accordingly, the controller may be configured to read, to process and/or to execute the pipetting protocol and/or the data records contained therein, which data records may be related to and/or indicative of the sequence of pipetting steps. The controller may derive one or more control signals from the data records of the pipetting protocol. The controller may provide one or more control signals to the motor to instruct the motor to move the piston according to the pipetting protocol, according to the sequence of pipetting steps contained in the pipetting protocol, and/or according to the data records. This allows to automatically reproduce the entire pipetting protocol and/or to reproduce also complex pipetting operations e.g. comprising a plurality of pipetting steps.

According to an embodiment of the invention, the at least one sensor comprises at least one of a Hall sensor, an accelerometer, a rotational sensor, an inertial sensor, an optical sensor, and a distance sensor. Specifically, the at least one sensor may be an electronic sensor. However, the pipetting device may comprise any sensor suitable for detecting a displacement of the actuating element, e.g. with high precision and accuracy. Particularly, the at least one sensor may be coupled to the actuating element to detect and/or determine a displacement of the actuating element.

According to an embodiment of the invention, the at least one sensor comprises a Hall sensor, wherein the pipetting protocol comprises data records indicative of a reading of the Hall sensor and/or indicative of a reading of the Hall sensor per unit time. Generally, the readings of the Hall sensor and/or the readings of the Hall sensor per unit time may be directly stored in the pipetting protocol. This may allow to generate and/or store the data records without pre-processing. Moreover, using a Hall sensor may allow to reliably and precisely determine the displacement of the actuating element. Also, using a Hall sensor may be advantageous in terms of a size and/or a robustness of the sensor.

According to an embodiment of the invention, the motor is electronically coupled to the actuating element and/or mechanically de-coupled from the actuating element. Accordingly, a volume to be aspirated and/or discharged by a full displacement of the actuating element can be individually defined and/or set.

According to an embodiment of the invention, the motor comprises at least one of a stepping motor, an electronic motor, and a pneumatic motor. Basically any suitable motor and/or drive allowing to precisely move the piston may be used.

According to an embodiment of the invention, the pipetting device further comprises a user interface, wherein the pipetting protocol stored in the data storage is selectable via and/or by actuating the user interface. The user-interface may comprise a graphical user interface and/or a touch display. An arbitrary number of pipetting protocols may be stored in the data storage, and any pipetting protocol may be selected by the user. Upon selecting a specific pipetting protocol, the pipetting protocol may be read and/or executed by the pipetting device. This allows to quickly select a specific pipetting protocol and/or to quickly switch between various pipetting protocols.

A further aspect of the invention relates to a method for operating a manual-electronic pipetting device with a manually displaceable actuating element, at least one piston for aspirating and discharging a medium, a motor for driving the at least one piston in response to an actuation and/or displacement of the actuating element, at least one sensor for determining a displacement of the actuating element, and a data storage. The method may refer to a method for operating a pipetting device, as described above and in the following. Alternatively or additionally the method may refer to a method for pipetting, aspirating and/or discharging a medium. The method comprises the steps of:

manually displacing the actuating element and/or moving the at least one piston in response to displacing the actuating element;
  deriving a pipetting protocol and/or data records of a pipetting protocol based on processing at least one sensor signal of the at least one sensor during displacing the actuating element and/or during moving the piston; and
  storing the pipetting protocol and/or data records of the pipetting protocol in the data storage, wherein the pipetting protocol comprises data records indicative of a position and a speed of the at least one piston during displacing the actuating element and/or during movement of the at least one piston.

It is to be noted that any features, functions, elements, and/or steps described above and in the following with respect to the pipetting device may be features, functions, elements, and/or steps of the method, as described above and in the following, and vice versa.

According to an embodiment of the invention, the method further comprises the steps of:
  reading the pipetting protocol and/or the data records of the pipetting protocol; and
  automatically moving the at least one piston according to the data records of the pipetting protocol, particularly by automatically controlling the position and the speed of the at least one piston according to the data records of the pipetting protocol.

According to an embodiment of the invention, the pipetting protocol comprises a sequence of pipetting steps. Alternatively or additionally, the pipetting protocol comprises data records indicative of and/or related to a sequence of pipetting steps.

The method further comprises the steps of:
reading the sequence of pipetting steps from the pipetting protocol and/or reading the data records indicative of the sequence pipetting steps; and
automatically moving the at least one piston according to the sequence of pipetting steps and/or according to the data records indicative of the sequence of pipetting steps, particularly by controlling the position and the speed of the at least one piston according to the pipetting protocol, according to the sequence of pipetting steps in the pipetting protocol and/or according to the data records indicative of the sequence of pipetting steps.

These and other aspects of the invention will be apparent from and elucidated with reference to the embodiments described hereinafter.

BRIEF DESCRIPTION OF THE DRAWINGS

The subject matter of the present disclosure will be explained in more detail in the following with reference to exemplary embodiments, which are illustrated in the attached figures.

In principle, identical or similar parts are provided with identical reference numerals.

DETAILED DESCRIPTION OF EMBODIMENTS

Figure 1:
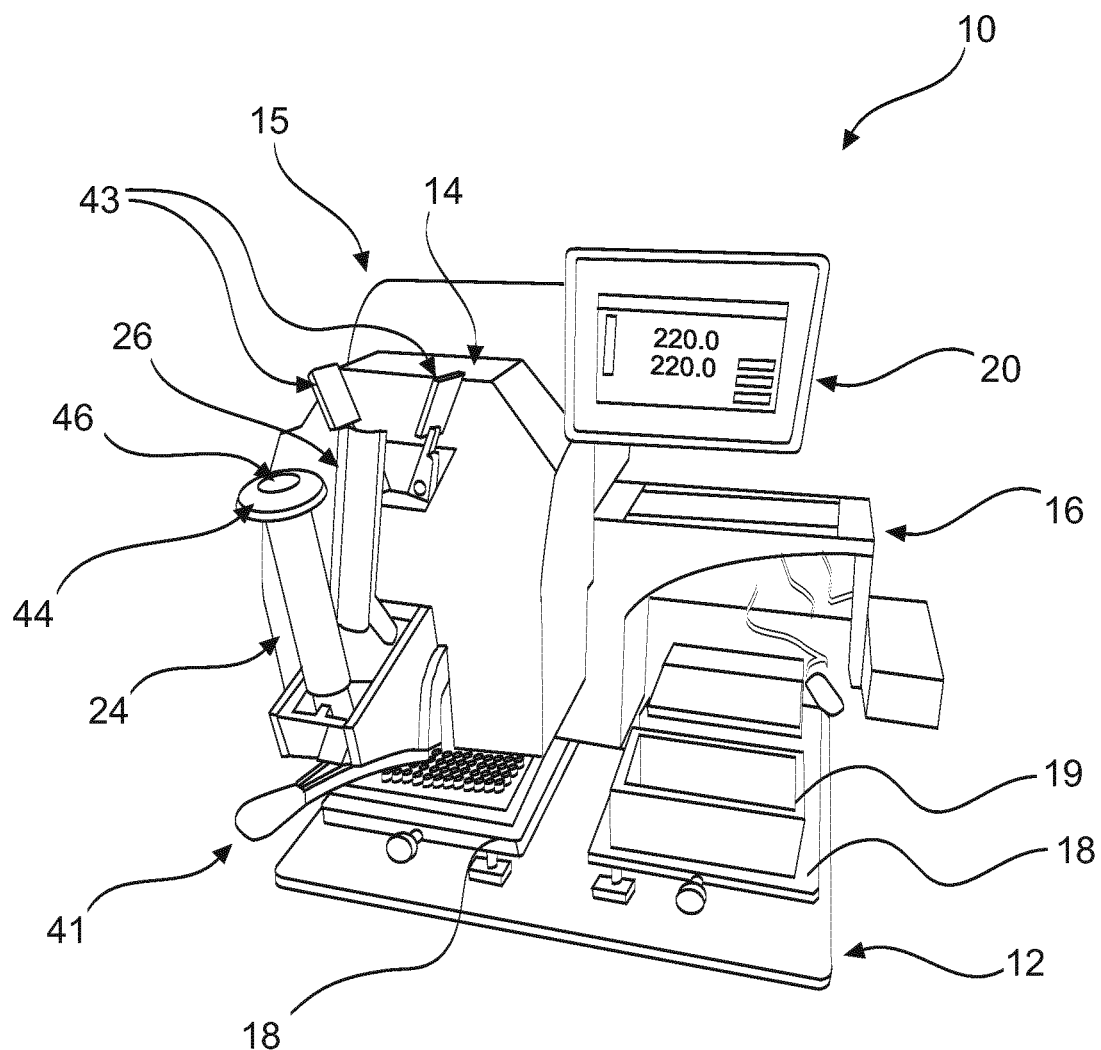
FIG. 1 shows schematically a perspective view of a pipetting device according to an exemplary embodiment.
Figure 2:
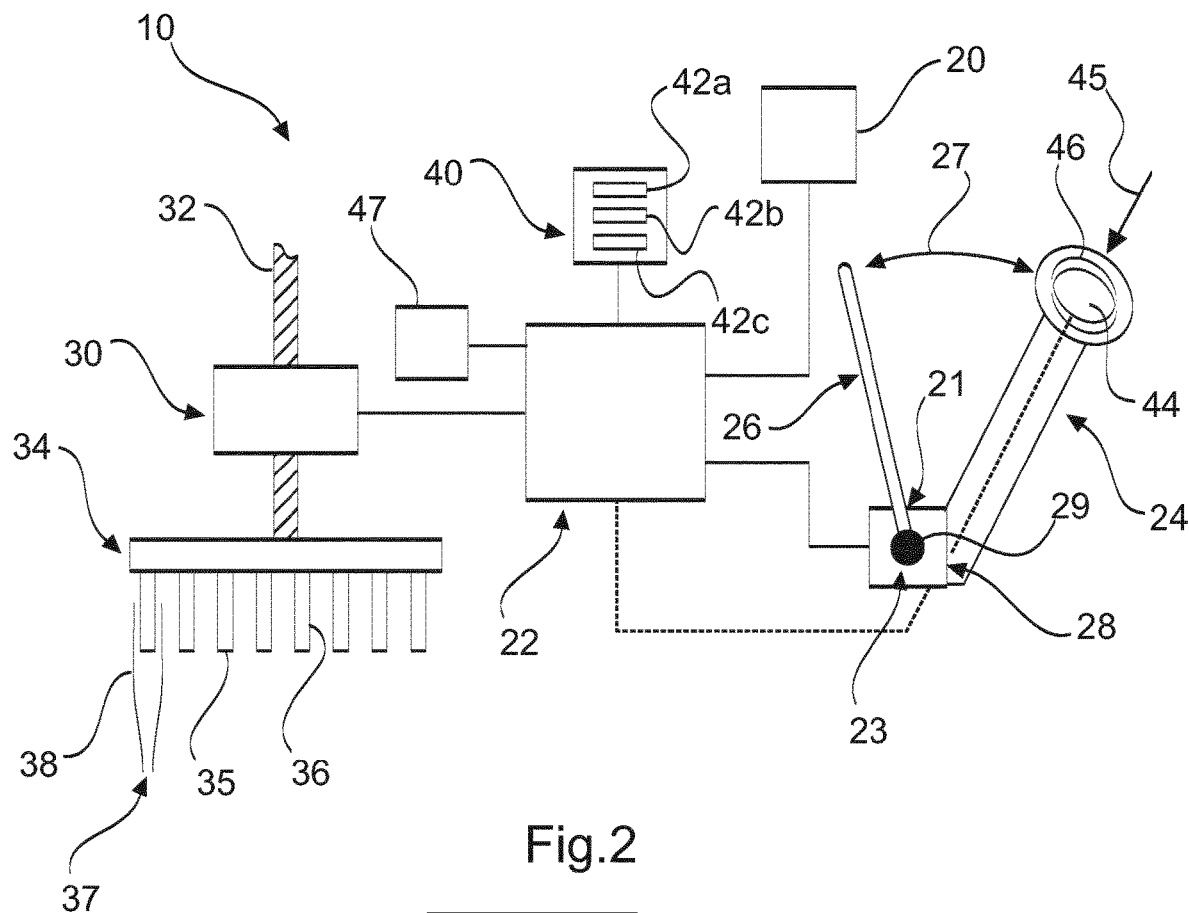
FIG. 2 shows schematically a block diagram of a part of the pipetting device of FIG. 1.

FIG. 1 shows schematically a perspective view of a pipetting device 10 according to an exemplary embodiment. FIG. 2 shows schematically a block diagram of a part of the pipetting device 10 of FIG. 1.

The pipetting device 10 comprises a base plate 12 for arranging the pipetting device 10 on a support, such as e.g. a table or the like. The pipetting device 10 further comprises a pipetting head 14, which is movably arranged on a rail 16 of the pipetting device 10. The pipetting head 14 may particularly be movable along a longitudinal extension direction of the rail 16. Further, the pipetting head 14 may be mechanically fixed, e.g. by means of a screw and/or a bolt, to a body 15 of the pipetting device 10. Further, the pipetting head 14 may be detached from the body 15 and/or the pipetting head 14 may be replaced by a further pipetting head 14.

On the base plate 12 of the pipetting device 10, one or more pipetting plates 18 and/or pipetting tables 18 are arranged. The one or more pipetting plates 18 are configured to support, hold and/or receive a multi-well plate 19. The multi-well plate 19 may comprise a plurality of compartments, into which a medium may be discharged and/or from which a medium may be aspirated by means of the pipetting device 10.

The pipetting device 10 further comprises a user interface 20. The user interface 20 may comprise a graphical user interface 20 and/or a touch display 20 allowing a user to configure the pipetting device 20 and/or providing information to the user about a currently performed pipetting operation, such as e.g. an aspirated and/or discharged volume of the medium or the like.

The pipetting device 10 further comprises a controller 22 for electronically controlling the pipetting device 10 and/or components thereof. The controller 22 is coupled to the user interface 20 and configured to control the user interface 20, e.g. to instruct the user interface 20 to output information and/or data.

The pipetting device 10 further comprises a pipetting handle 24 and/or handle 24, which may serve as a support for a hand of a user.

The pipetting device 10 further comprises an actuating element 26. The actuating element 26 is manually displaceable and/or actuatable by the user. Particularly, the actuating element 26 is configured for manual actuation and/or displacement by the user. In the embodiment depicted in FIGS. 1 and 2, the actuating element 26 is formed as a rotationally displaceable lever 26, wherein one end 21 of the actuating element 26 is rotatably fixed, such that the actuating element 26 can be rotated around a rotational axis 23. The actuating element 26 may be displaced in two opposite displacement directions 27 of the actuating element 26, as indicated by arrow 27 in FIG. 2. Further, the actuating element 26 is displaceable within a displacement range of the actuating element 26, wherein the displacement range ranges from an initial position of the actuating element 26 to a final position of the actuating element 26. The initial position may refer to an initial angle and the final position may refer to a final angle of the actuating element 26. The actuating element 26 shown in FIG. 2 may be in the initial position, and the final position may correspond to a position of the actuating element 26, in which the actuating element 26 may be moved over the entire displacement range towards the pipetting handle 24. A displacement of the actuating element 26 over the entire displacement range may refer to a full displacement of the actuating element 26, whereas a displacement of the actuating element 26 to a position between the initial position and the final position may be referred to as partial displacement of the actuating element 26. The actuating element 26 may be pre-stressed and/or biased towards the initial position. It is to be noted that the actuating element 26 may also be formed as a translationally movable and/or displaceable actuating element 26.

On and/or close to the end 21 of the actuating element 26, which is rotatably fixed, at least one sensor 28 is arranged. By way of example, the sensor 28 may be a Hall Sensor 28 comprising a magnet element 29. The magnet element 29 may be attached to and/or arranged on the end 21 of the actuating element 26. The sensor 28 is configured to determine and/or detect a displacement of the actuating element 26. The sensor 28 may be configured to detect a rotational displacement of the actuating element 26 by an angle and/or detect a rotational speed of the displacement of the actuating element 26. Therein, the angle may refer to an angle and/or may be measured between a first position of the actuating element 26 and a second position of the actuating element 26, e.g. the first position differing from the second position. The sensor 28 is coupled to the controller 22 and configured to provide and/or output one or more sensor signals in response to an actuation and/or displacement of the actuating element 26. Accordingly, the one or more sensor signals may be indicative of a direction 27, into which the actuating element 26 is displaced, a speed, with which the actuating element 26 is displaced, a rotational speed, with which the actuating element 26 is displaced, an angle, by which the actuating element is displaced, and/or a distance, by which the actuating element 26 is displaced. It is to be noted that alternatively or additionally to the Hall sensor 28 any other type of sensor 28 suitable for determining a displacement of the actuating element 26 may be used. E.g. the sensor 28 may comprise an accelerometer, a rotational sensor, an inertial sensor, an optical sensor, and/or a distance sensor.

The pipetting device 10 further comprises a motor 30 and/or drive 30. In the example depicted in FIG. 2, the motor 30 is a stepping motor 30 coupled to a shaft 32 and/or spindle 32. However, the motor 30 may alternatively be a pneumatic motor 30 and/or an electric motor 30. The motor 30 is electronically coupled to the controller 22. The controller 22 may provide one or more control signals to the motor 30 to actuate the motor 30, such that the shaft 32 is moved along a longitudinal extension direction of the shaft 32.

The pipetting device 10 further comprises a piston plate 36 coupled to the shaft 32 and/or coupled to an end of the shaft 32. The piston plate 34 comprises a plurality of pistons 36 arranged on an outer surface of the piston plate 34. The pistons 36 may be arranged in an arbitrary pattern and/or in an array on the piston plate 34. Each of the pistons 36 may be substantially cylindrically shaped. The piston plate 34 with the pistons 36 may be detachably fixed to the shaft 32, such that different piston plates 34 e.g. with a different number of pistons 36 may be used with the pipetting device 10.

To each of the pistons 36 a fluid compartment 38 and/or a pipetting tip 38 may be detachably affixed, wherein at least a part of each of the pistons 36 may be movably and/or fluid-tightly arranged in the pipetting tip 38 such that fluid may be aspirated via an opening 37 on a distal end of each pipetting tip 38 into the pipetting tip and/or aspirated out of the pipetting tip 38. Exemplary, in FIG. 2, only a single pipetting tip 38 is shown which is directly attached to one of the pistons 36. However, it is to be noted that alternatively or additionally the piston plate and/or the pistons 36 may be coupled and/or attached to a cylinder plate and/or to a pin plate. Accordingly, the pipetting tips 38 may be attached to the cylinder plate and/or the pin plate. To attach pipetting tips 37 to the pistons 36, the cylinder plate and/or the pin plate, the pipetting device 10 comprises a tip attachment device 41, which may be a lever. To detach the pipetting tips 38 from the pistons 36, the cylinder plate and/or the pin plate the pipetting device 10 further comprises a detachment means 43.

A manual pipetting operation of the pipetting device 10 may be performed as described in the following. The user may displace the actuating element 26 with a certain speed, by a certain distance, by a certain angle, with a certain rotational speed, and/or in a certain direction of the actuating element 26. The sensor 28 determines and/or detects the displacement of the actuating element 26 and provides one or more sensor signals to the controller 22. The controller 22 may then derive and/or determine one or more control signals based on the one or more sensor signals. The controller 22 may output and/or provide the one or more control signals to the motor 30 to actuate the motor 30 and/or to instruct the motor to move the piston plate 34 and/or the pistons 36 according and/or corresponding to the displacement of the actuating element 26. Accordingly, each of the pistons 36 may be moved, e.g. within the pipetting tip 38, by a distance and/or to a position, which corresponds to the distance and/or angle, by which the actuating element 26 is displaced. Further, each of the pistons 36 may be moved, e.g. within the pipetting tip 38, with a speed corresponding to a speed, with which the actuating element 26 is actuated. The speed may be a rotational speed. Moreover, each of the pistons 36 may be moved, e.g. within the pipetting tip 38, in a direction corresponding to the direction, in which the actuating element 26 is displaced. Accordingly, the motor 30, the piston plate 34 and/or the pistons 36 is mechanically de-coupled from the actuating element 26. The motor 30 is electronically coupled, e.g. via the controller 22 and/or the sensor 28, to the actuating element 26. Accordingly, any displacement of the actuating element 26 is translated and/or converted by the controller 22 and/or the sensor 28 into a movement of the piston plate 34 and/or the pistons 36. Particularly, the pistons 36 may be moved synchronously to the displacement of the actuating element 26.

The pipetting device 10 further comprises a data storage 40 coupled to the controller 22. In the data storage 40 one or more pipetting protocols 42a, 42b, 42c may be stored. Each of the pipetting protocols 42a-42c comprises data records indicative of, related to, correlating with and/or representing a position of the pistons 36, which may refer to a position of a front surface 35 of each piston 36 and/or which may refer to a position of a front surface 35 of each piston 36 in the respective pipetting tip 38. Further, each of the pipetting protocols 42a-42c comprises data records indicative of, related to, correlating with and/or representing a speed of the pistons 36, which may refer to a speed of the front surface 35 of each piston 36 and/or which may refer to a speed of the front surface 35 of each piston 36 in the respective pipetting tip 38, with which speed each of the pistons 36 is moved, e.g. within the respective pipetting tip 38. A user can select any of the pipetting protocols 42a-42c on the user interface 20 and/or execute any of the pipetting protocols 42a-42c by actuation of the user interface 20. The controller 22 may read the selected pipetting protocol 42a-42c and/or the data records contained therein and e.g. derive one or more control signals from the data records. The controller 22 may provide the one or more control signals to the motor 30 to instruct the motor 30 to move the piston plate 34 and/or the pistons corresponding to the data records of the pipetting protocol 42a-42c and/or corresponding to the pipetting protocol 42a-42c. Accordingly, the controller 22 is configured to control the position and the speed of each of the pistons 36 according to the pipetting protocol 42a-42c, and the entire pipetting protocol 42a-42c may be automatically repeated and/or executed by the pipetting device 10. Hence, each of the pipetting protocols 42a-42c may refer to a pipetting program containing instructions, e.g. in the form of the data records, to instruct the pipetting device 10 and/or the controller 22 to perform a pipetting operation described in and/or represented by the pipetting protocol 42a-42c.

Apart from reading and executing a stored pipetting protocol 42a-42c, the pipetting device 10 advantageously allows to generate and/or store a new pipetting protocol 42a-42c. This may render any re-programming and/or configuration of the pipetting device 10 unnecessary and provides an intuitive way for the user to program the pipetting device. To generate a new pipetting protocol 42a-42c, the user can manually actuate and/or displace the actuating element 26. The user can displace the actuating element 26 by a certain distance, length, and/or angle. Concerning the rotatably movable actuating element 26 depicted in FIGS. 1 and 2, this distance of the displacement may refer to an angle, by which the actuating element 26 is displaced. Further, the user can displace the actuating element 26 with a certain speed, which is referred to as a speed of the displacement and/or a rotational speed of the actuating element 26. Further, the user can actuate the actuating element 26 in a certain direction 27 and/or displacement direction 27. While actuating and/or displacing the actuating element 26 manually, the controller 22 can process the one or more sensor signals provided by the sensor 28 to the controller 22 during the displacement of the actuating element 26. Based on the one or more sensor signals of the sensor 28, the controller 22 can automatically determine, derive and/or generate the pipetting protocol 42a-42c and/or data records of the pipetting protocol 42a-42c. The controller 22 further can, e.g. automatically, store the derived pipetting protocol 42a-42c and/or the determined data records of the pipetting protocol 42a-42c in the data storage 40. Therein, the data records stored in the pipetting protocol 42a-42c may be indicative of the displacement of the actuating element 26, i.e. the distance, the angle, the speed, the rotational speed, and/or the direction of the actuating element 26. Further, the data records may be indicative of the position and the speed of each piston 36 during displacement of the actuating element 26. Also, the data records may be indicative of a direction in which each piston 36 is moved during the displacement of the actuating element 26. Moreover, the data records may be indicative of a volume discharged by each piston 36, a volume aspirated by each piston 36, a volume discharged by each piston 36 per unit time, a volume aspirated by each piston 36 per unit time. Further, the data records may be indicative of a reading of the sensor 28 and/or a reading of the sensor 28 per unit time.

Apart from that, particularly when complex pipetting operations are to be performed, a single pipetting operation may comprise a plurality of at least partly differing pipetting steps. Generally, a single pipetting step may refer to a single displacement of the actuating element 26. The pipetting steps may e.g. differ from another in terms of the distance and/or angle of the respective displacement, in terms of a speed of the respective displacement and/or in terms of a direction of the respective displacement of the actuating element 26. The pipetting device 10 is also configured to map such pipetting steps in the pipetting protocol 42a-42c. In order to map and/or store one or more pipetting steps in the pipetting protocol 42a-42c, the controller 22 is configured to determine a time period between two consecutive displacements of the actuating element 26, e.g. based on one or more sensor signals of the sensor 28, and to compare this time period with a predetermined threshold, which may e.g. be stored in the data storage 40. In case the time period between two consecutive displacements exceeds the predetermined threshold, the controller 22 determines termination of a single pipetting step and/or determine start of a further single pipetting step. In response to determining a termination of the pipetting step, the controller 22 may store a data record and/or a termination data record indicative of the termination of the single pipetting step and/or indicative of the start of the further single pipetting step. This way, a sequence of pipetting steps may be stored in the pipetting protocol 42a-42c.

The pipetting device 10 comprises a further actuating element 44 coupled to the controller 22, wherein the further actuating element 44 can be actuated by the user to signal termination of a single pipetting step to the controller 22. Accordingly, the controller 22 is configured to determine termination of a single pipetting step and/or start of a further pipetting step based on actuation of the further actuating element 44 and/or based on a control signal provided by the further actuating element 44 to the controller 22 in response to an actuation of the further actuating element 44. This way, a sequence of pipetting steps may be stored in the pipetting protocol 42a-42c.

The further actuating element 44 is arranged in and/or integrated in the handle 24. This allows a user to actuate the further actuating element 44 while also displacing the actuating element 26 with only one hand. The further actuating element 44 may be a button that may be pressed by the user in longitudinal extension direction 45 of the handle 24. However, any other further actuating element 44, such as e.g. a lever and/or a button at another position of the pipetting device 10 is conceivable.

Also the sequence of pipetting steps stored in a pipetting protocol 42a-42c and/or the data records describing the pipetting steps may be read by the controller 22. The controller 22 may derive control signals from and/or based on the data records and instruct the motor 30 to drive the pistons 36 according to the pipetting steps of the pipetting protocol 42a-42c. Accordingly, also a complex pipetting operation comprising a plurality of consecutive pipetting steps can be stored, read and/or automatically executed by the pipetting device 10. Therein, the position of each piston 36, the speed of each piston 36 and/or a direction of movement of each piston 36 is controlled by the controller 22 based on and/or corresponding to the data records of the pipetting protocol 42a-42c and/or corresponding to the sequence of pipetting steps contained therein.

In the following, various further aspects of the pipetting device 10 are described. The pipetting device 10 may refer to a semi-automatic pipetting device, in which the pistons 36 are moved by means of the motor 30 and which allows manual operation.

Any displacement of the actuating element 26 may be converted synchronously into a movement of the pistons 36, wherein also a speed of the displacement of the actuating element 26 as well as a speed of the pistons 36 can be varied.

For generating a new pipetting protocol 42a-42c, a plurality of pipetting steps can be performed manually by the user and the pipetting device stores data records indicative of a piston stroke, a piston position and/or a piston speed in the pipetting protocol 42a-42c. E.g. by actuating the further actuating element 44 after a single pipetting step is finished and/or performed, a further pipetting step stored in the pipetting protocol 42a-42c may be started, repeated and/or executed. Accordingly, the pipetting device 10 does not require a complex programming via the user interface 20.

During pipetting, exactly the volume of the medium present in each pipetting tip 38 may be displayed on the user interface 20. By actuating and/or pressing the further actuating element 44, a movement of the pistons 36 may be stopped. Accordingly, the pipetting device 10 may be used to determine the volume of medium in the pipetting tips 38. This is helpful for many pipetting operations, as determination of the absolute volume may be important for further pipetting steps. E.g. an excess volume may be adjusted according to a following pipetting step. For instance, this allows to add double the volume of a reagent to the excess volume.

Moreover, the pipetting device 10 comprises a repetitive mode and/or step mode, which may be selected on the user interface 20, e.g. via actuation of the user interface 20, and/or via actuation of the further actuating element 44. In the step mode, a definable volume and/or a defined volume may be discharged in a plurality of discharging steps. The definable volume may correspond to an actual volume of the medium present in the pipetting tips 38. The user may e.g. define a number of discharging steps and the controller 22 may automatically determine a partial volume to be discharged in each of the discharging steps, taking into account the definable and/or the defined volume, which may e.g. be a maximum volume or any other volume of the medium present in the pipetting tips 38. Alternatively or additionally, the user may define the partial volume and the controller 22 may automatically determine the number of discharging steps taking into account the definable and/or the defined volume present in the pipetting tips 38.

Further, the pipetting device 10 may comprise a normal mode, which may be selected via the user interface 20 by the user. In the normal mode, the pipetting device 10 may be operated manually by the user.

Apart from that, the pipetting device 10 may comprise a macro mode, in which any of the pipetting protocols 42a-42c stored in the data storage may be selected by the user and any selected pipetting protocol 42a-42c may be executed. In case the selected pipetting protocol 42a-42c comprises a plurality of pipetting steps, the pipetting device may stop after each pipetting step. The user may actuate the further actuating element 44 to instruct the pipetting device 10 to continue with a consecutive and/or following pipetting step. Further, a new pipetting protocol 42a-42c may be generated by the user in the macro mode.

Apart from that, the pipetting device 10 may comprise an indicator 46, such as e.g. one or more color LEDs, wherein a color of the indicator 46 may change according to the selected mode of the pipetting device, i.e. the step mode, the normal mode and/or the macro mode.

Moreover, the pipetting device 10 may be configured to generate a log file for any operation performed with the pipetting device 10.

Moreover, the pipetting device 10 may comprise a communication interface 47 via which any data stored in the data storage 40 may be read and/or provided to a further user. The communication interface 47 may e.g. comprise an USB slot, a Wireless LAN interface, a LAN interface, an infrared interface, a Bluetooth interface and/or any other type of communication interface 47. Further, via the communication interface 47 a pipetting protocol 42a-42c stored in the data storage 40 may be read, transferred to another device and/or stored externally. Further, a pipetting protocol 42a-42c stored and/or generated in another pipetting device (or e.g. on a computer) may be transferred and/or transmitted via the communication interface 47 to the pipetting device 10 and/or stored in the data storage 40. This advantageously allows to exchange various pipetting protocols 42a-42c between various pipetting devices 10.

Further, via the communication interface 47 the pipetting device 10 may be coupled to an external control device, such as e.g. a handheld, a tablet PC, a smart phone, a Notebook and/or a PC. The pipetting device 10 may output any information displayed on the user interface 20 to the control device, such that the information may be displayed on the control device. Also, the pipetting device 10 may be at least partly controlled by the control device via the communication interface 47.

Moreover, the pipetting device 10 may comprise one or more sensors for determining a position of the pipetting head 14, e.g. a position of the pipetting head 14 on the rail 16. Further, the pipetting device 10 may comprise one or more sensors to determine and/or detect a position of each of the pipetting plates 18 and/or pipetting tables 18.

This may allow to warn the user, in case the pipetting head 14 and/or one or more of the pipetting plates 18 is in an incorrect position, e.g. during a complex pipetting operation.

Further, the pipetting device 10 may comprise one or more barcode readers to make sure that a pipetting operation is performed correctly.

Further, the pipetting device 10 may comprise a test system with one or more sensors for determining a temperature, humidity and/or atmospheric pressure, which may be used to correct a movement of the pistons 36 according to the current temperature, humidity and/or atmospheric pressure.

Figure 3:
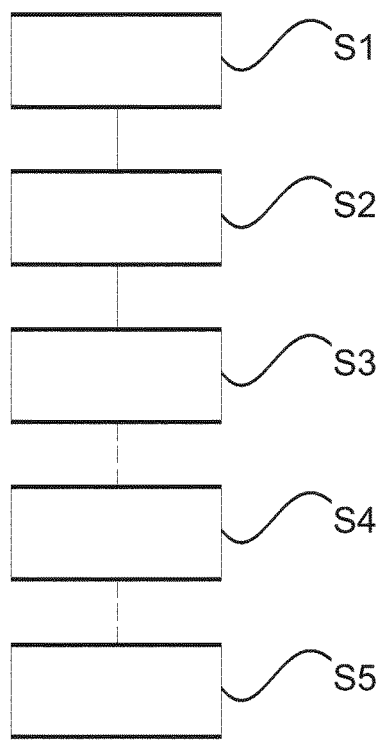
FIG. 3 shows a flow chart illustrating steps of a method for operating a pipetting device according to an exemplary embodiment.

FIG. 3 shows a flow chart illustrating steps of a method for operating a pipetting device 10 according to an exemplary embodiment.

The pipetting device 10 may be a pipetting device 10 as described with reference to FIGS. 1 and 2. Particularly, the pipetting device 10 comprises a manually displaceable actuating element 26, at least one piston 36 for aspirating and discharging a medium, a motor 30 for driving the at least one piston 36 in response to an actuation and/or displacement of the actuating element 26, at least one sensor 28 for determining a displacement of the actuating element 26, and a data storage 40.

In a step S1 the actuating element is manually displaced and/or the at least one piston 36 is moved in response to displacing the actuating element.

In a further step S2 a pipetting protocol 42a-42c is derived based on processing one or more sensor signals of the at least one sensor 28 during displacing the actuating element 26.

In a further step S3, the pipetting protocol 42a-42c is stored in the data storage 40, wherein the pipetting protocol 42a-42c comprises data records indicative of a position and a speed of the at least one piston 36 during displacing the actuating element 26.

In an optional step S4 the pipetting protocol 42a-42c and/or the data records contained therein are read. Also a sequence of pipetting steps may be read in step S4 from the pipetting protocol 42a-42c.

In a further optional step S5 the at least one piston 36 is automatically moved according to the data records of the pipetting protocol 42a-42c, particularly by automatically controlling the position and the speed of the at least one piston 36 according to the data records of the pipetting protocol, e.g. by means of the controller 22 and/or by actuation of the motor 30. Also, the at least one piston 36 may be moved in step S5 according to the sequence of pipetting steps, particularly by controlling the position and the speed of the at least one piston 36 according to the pipetting protocol 42a-42c and/or the sequence of pipetting steps in the pipetting protocol 42a-42c.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A manual-electronic pipetting device for pipetting a medium, the pipetting device comprising:
   a memory including stored instructions;
   a controller electronically connected to the memory;
   a manually displaceable first actuating element;
   at least one piston that aspirates and discharges the medium when displaced within a pipette tip;

a motor connected to the controller and the first actuation element, wherein the motor drives the at least one piston in response to an actuation and/or displacement of the first actuating element;

at least one sensor connected to the controller and the first actuating element, wherein the at least one sensor determines a displacement of the first actuating element; and a data storage electronically connected to the controller;

wherein the stored instructions of the memory include instructions that when executed by the controller causes the controller to generate a pipetting protocol based on at least one sensor signal of the at least one sensor during a displacement of the first actuating element and a movement of the at least one piston in response to the displacement of the first actuating element, and wherein the memory further stores instructions that when executed by the controller causes the controller to store the pipetting protocol in the data storage, the pipetting protocol comprising data records indicative of a position and a speed of the at least one piston during the displacement of the first actuating element.

2. The pipetting device according to claim 1,
wherein the memory further stores instructions that when executed by the controller causes the controller to read the pipetting protocol and to automatically control and/or adjust the position and the speed of the at least one piston according to the data records of the pipetting protocol.

3. The pipetting device according to claim 1,
wherein the memory further stores instructions that when executed by the controller causes the controller to determine at least one pipetting step during a displacement of the first actuating element based on at least one sensor signal of the at least one sensor; and/or wherein the memory further stores instructions that when executed by the controller causes the controller to store, in the data storage, data records indicative of a distance and a speed of the displacement of the first actuating element during the at least one pipetting step.

4. The pipetting device according to claim 3,
wherein the pipetting device comprises a second actuating element; and
wherein the memory further stores instructions that when executed by the controller causes the controller to deteHnine a termination of a single pipetting step based on an actuation of the second actuating element.

5. The pipetting device according to claim 3,
wherein the memory further stores instructions that when executed by the controller causes the controller to determine a termination of a single pipetting step based on comparing a time period between two consecutive displacements of the first actuating element with a predefined threshold.

6. The pipetting device according to claim 3,
wherein the pipetting protocol comprises a sequence of pipetting steps.

7. The pipetting device according to claim 1,
wherein the pipetting protocol comprises a sequence of pipetting steps; and
wherein the memory further stores instructions that when executed by the controller causes the controller to read the sequence of pipetting steps from the pipetting protocol, and to control and/or adjust the position and the speed of the at least one piston according to the sequence of pipetting steps.

8. The pipetting device according to claim 1,
wherein the at least one sensor comprises at least one of a Hall sensor, an accelerometer, a rotational sensor, an inertial sensor, an optical sensor, and a distance sensor.

9. The pipetting device according to claim 1,
wherein the at least one sensor comprises a Hall sensor; and
wherein the pipetting protocol comprises data records indicative of a reading of the Hall sensor and/or indicative of a reading of the Hall sensor per unit time.

10. The pipetting device according to claim 1,
wherein the motor is electronically coupled to the first actuating element and/or mechanically de-coupled from the first actuating element.

11. The pipetting device according to claim 1,
wherein the motor comprises at least one of a stepping motor, an electronic motor, and a pneumatic motor.

12. The pipetting device according to claim 1, further comprising:
a user interface connected to the controller,
wherein the pipetting protocol stored in the data storage is selectable via the user interface.

13. A method for operating a manual-electronic pipetting device with having a controller, a manually displaceable actuating element, at least one piston displaceable within a pipette tip and that aspirates and discharges a medium, a motor that drives the at least one piston in response to an actuation of the actuating element, at least one sensor that determines a displacement of the actuating element, and a data storage, the method comprising:
manually displacing the actuating element;
generating, with the controller, a pipetting protocol based on processing a sensor signal of the at least one sensor during displacing the actuating element and moving the at least one piston in response to displacing the actuating element; and
storing the pipetting protocol in the data storage,
wherein the pipetting protocol comprises data records indicative of a position and a speed of the at least one piston during displacing the actuating element.

14. The method according to claim 13, further comprising:
reading, by the controller, the pipetting protocol; and
automatically moving the at least one piston according to the data records of the pipetting protocol, by automatically controlling, with the controller, the position and the speed of the at least one piston according to the data records of the pipetting protocol.

15. The method according to claim 13, wherein the pipetting protocol comprises a sequence of pipetting steps, wherein the method further comprises:
reading, by the controller, the sequence of pipetting steps from the pipetting protocol; and
automatically moving the at least one piston according to the sequence of pipetting steps, by controlling, with the controller, the position and the speed of the at least one piston according to the pipetting protocol.

* * * * *